(12) United States Patent
Chithambaram

(10) Patent No.: US 6,985,747 B2
(45) Date of Patent: Jan. 10, 2006

(54) USE OF TRIGGERS AND A LOCATION HYPERCUBE TO ENABLE PUSH-BASED LOCATION APPLICATIONS

(75) Inventor: Nemmara Chithambaram, Novato, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 10/772,998

(22) Filed: Feb. 5, 2004

(65) Prior Publication Data

US 2004/0156326 A1 Aug. 12, 2004

Related U.S. Application Data

(60) Provisional application No. 60/445,061, filed on Feb. 5, 2003.

(51) Int. Cl.
*H04Q 7/20* (2006.01)

(52) U.S. Cl. .............................. 455/456.5; 455/456.3; 455/456.1; 455/421; 340/539.13

(58) Field of Classification Search .............. 455/456.5, 455/456.3, 456.1, 404.2, 404.1, 421, 414.1, 455/426.1, 457, 41.1–41.3, 517; 340/539.13, 340/539.11, 573.1, 573.4, 572.1; 342/451, 342/450; 370/310
See application file for complete search history.

(56) References Cited

U.S. PATENT DOCUMENTS 6,091,956 A * 7/2000 Hollenberg .............. 455/456.5
6,292,672 B1 * 9/2001 Chavez, Jr. ............... 455/456.6
6,539,232 B2 * 3/2003 Hendrey et al. .......... 455/456.1
6,553,236 B1 * 4/2003 Dunko et al. ............... 455/457
2003/0013456 A1   1/2003 Bates et al. .............. 455/456.1

OTHER PUBLICATIONS

"Mobile Location Protocol", Location Inter-operability Forum (LIF), Version 3.0.0, pp. 1–92, Jun. 6, 2002.

* cited by examiner

*Primary Examiner*—Sonny Trinh
*Assistant Examiner*—Eliseo Ramos-Feliciano
(74) *Attorney, Agent, or Firm*—Gates & Cooper LLP

(57) ABSTRACT

A method, system, and article of manufacture enable the use of location based applications (LBA). A location server (LS) on a wireless network receives trigger information from a LBA that is located outside of the wireless network. The trigger information defines a source locatable, spatial information (defining spatial criteria for a target locatable), a notification flag (describing) an interaction between the source locatable and the spatial criteria), and temporal information (defining a time period the trigger will be active). The LS determines if the triggers are active based on the temporal information and obtains updated locations if the trigger is active. Active triggers are evaluated to determine if a trigger alert has been caused by the locatables interacting with each other pursuant to the spatial information and notification flag. A location answer is pushed to the LBA if a trigger alert has been caused.

31 Claims, 8 Drawing Sheets

USE OF TRIGGERS AND A LOCATION HYPERCUBE TO ENABLE PUSH-BASED LOCATION APPLICATIONS

CROSS-REFERENCE TO RELATED APPLICATIONS

This application claims the benefit under 35 U.S.C. Section 119(e) of the following now abandoned and commonly-assigned U.S. provisional patent application(s), which is/are incorporated by reference herein:

Provisional Application Ser. No. 60/445,061, filed Feb. 5, 2003, by Nemmara Chithambaram and Howard Marantz, entitled "USE OF LOCATION TRIGGER, LOCATION HYPERCUBE TO ENABLE PUSH-BASED APPLICATION FRIEND FINDER, CHILD MONITOR, OTHER APPLICATIONS,"

This application is related to the following co-pending and commonly-assigned patent application, which application is incorporated by reference herein:

U.S. patent application Ser. No. 10/034,442, entitled "FUZZY LOGIC REASONING FOR INFERRING USER LOCATION PREFERENCES", filed on Dec. 26, 2001 by Nemmara Chithambaram.

BACKGROUND OF THE INVENTION

1. Field of the Invention

The present invention relates generally to wireless networks and location based services, and in particular, to a method, apparatus, and article of manufacture for using spatial triggers in a wireless network to provide a location based service.

2. Description of the Related Art

Wireless networks currently have the capability to detect the location/position of a mobile station (e.g., mobile phones, wireless personal digital assistants, etc.). A location-based application/service (hereafter referred to as "LCS" or "LBA") that is located outside of the wireless network may desire to use such location/position information. However, to retrieve the location information, the LBA must request (also referred to as "pull") the location/position from the wireless location server (also referred to as a mobile position server) that is located within the wireless network each time the location is required. In response to the request, the wireless location server individually polls each mobile station to determine their location/position and provides the results to the LBA.

The prior art methodology presents many problems and limitations. For example, the prior art fails to provide the capability for a wireless network to automatically detect a proximity event (e.g., using a trigger) and alert/notify a LBA (e.g., notify the LBA if a child with a mobile station leaves the school premises during school hours on weekdays). To provide such functionality, applications/LBA must typically continuously poll the wireless location server (e.g., every minute or two) to detect if there are interesting location events. This increases the load on the mobile position server by several orders of magnitude, and severely impacts the throughput (and therefore hardware performance and cost). Further, the absence of a location trigger on the wireless network has resulted in each application/LBA provider building custom/proprietary mechanisms for detecting proximity events. Such mechanisms are fragmented and/or replicated at the application tier at each application provider site. The problems of the prior art may be better understood by describing prior art wireless networks and location based services.

FIG. 1 illustrates the configuration for a prior art wireless network and location based application. Wireless network 100 provides the ability for communication between multiple devices. For example, mobile stations (MS) 102 (including mobile phones, wireless personal digital assistants, etc.) may communicate with each other on wireless network 100. The wireless network 100 has the capability to detect the location of an MS 102. Location server 104 interfaces with the MS 102 to determine and provide the MS 102 locations to devices outside of the network 100.

Various applications may provide services that are based on the location of one or more MS 102. Such applications are referred to as location based applications 106. In the prior art, LBAs 106 are executed outside of the wireless network 100 by a location services client 108. To provide a location based service, the LBA 106 must know the location of the MS 102 on the wireless network 100. A mobile location protocol (MLP) is an application-level protocol for getting the position of MS 102 independent of underlying network 100 technology. In other words, the MLP provides a protocol for querying the position of the MS 102. The MLP serves as the interface between a location server 104 and an LBA 106 (and location based client 108 providing the LBA). As illustrated in FIG. 1, the LBA 106 or LCS client 108 may first issue a request 110 (in the MLP) for an MS 102 location from location server 104. The location server 104 will poll the individual MS devices 102 and provide the location in a (MLP based) response 112 to the LCS client 108.

The LBAs 106 of the prior art obtain the location of a MS 102 by using one of three basic methods as described in LIF MLP 3.0 (June 2002) (Location Inter-Operability Forum Mobile Location Protocol) (for commercial applications) which is incorporated by reference herein: (1) Standard Location Immediate Service; (2) Standard Location Reporting Service; and (3) Triggered Location Reporting Service.

The Standard Location Immediate service is a service used for requesting the location of more of more MS 102 when a location response is required immediately (within a set time). Thus, a single response from the location server 104 is reported to the LCS client 108 or LBA 106 immediately (i.e., prior to the expiration of a set time).

The Standard Location Reporting Service enables a MS 102 to have the MS 102 sent to an LBA 106/LCS client 108. Thus, when an MS 102 wants an LBA 106 or LCS client 108 to receive the MS 102 location, a standard location report is generated. The LBA 106 or LCS client 108 that the location report should be sent to is specified by the MS 102 or defined within the location server 104.

The triggered location reporting service is used when an LBA 106 or LCS client 108 wants the position of a list of MS 102 to be tracked and reported to the LBA 106/LCS 108 based on a trigger (such as at a specific time interval or on the occurrence of a specific event). As specified in the LIF MLP 3.0 document, the triggers specified in the prior art may comprise a periodicity time defined by an interval or an MS 102 action, defined as when the MS 102 is available (i.e., when the MS 102 regains a connection with the network 100 after having been lost).

The standard location immediate service and standard location reporting service have been implemented in various GMLC (gateway mobile location center) elements in the prior art networks 100. However, the triggered location reporting service identified in the LIF MLP 3.0 merely provides a protocol that could be used if and when a triggered reporting service is offered.

LBAs 106 may provide various useful functionalities. Popular and desirable LBAs 106 include friend finders, fleet trackers, pet/child monitors, and location sensitive coupon push services. A friend finder application allows one friend using an MS 102 to determine when another friend is in a defined proximity. A fleet tracker application provides the ability for a business to track a fleet of employees, trucks, etc. A pet/child monitor provides the ability to determine when a pet/child leaves or enters a defined area. The location sensitive coupon push service provides the ability to determine when a MS 102 is in proximity to a particular business and to send a coupon for goods or services offered by the business. All of these LBAs 106 are based primarily on location trigger events. However, such location trigger events are not available in prior art systems.

As described above, the problems with such LBAs 106 are numerous. Firstly, the trigger events require spatial analysis by location server 104, a capability that is not an inherent part of the prior art wireless networks 100. Further, prior art capacity requirements for standard location services are significantly less than that required for conducting the desired spatial analysis. This capacity problem is further exacerbated since each LBA 106 continuously polls (i.e., requests 110) the location server 104 to detect these trigger events. For example, a friend finder application would continuously poll the location server 104 with requests 110 (e.g., every two minutes), to determine if members of the friend group are within the specified proximity. In the absence of the triggers, a single execution of such a use case can produce several thousand requests 110 per friend group, in a single hour.

In view of the above, the problems of the prior art systems may be summarized as usability limitations and capacity stress on the location server 104. With respect to usability, the absence of location trigger service on/at the wireless network 100 means that each application is required to replicate a proprietary mechanism for determining proximity events for use cases like the friend finder, fleet tracker, coupon push, etc. These mechanisms are fragmented and/or replicated at the application tier (by each application provider).

With respect to the capacity and stress on the location server 104, the popularity of LBAs 106 combined with application architectures that rely on continuously polling the location server 104 results in location server 104 requests 110 increasing by several orders of magnitude. Additionally, the peak load adds significant spikes to the server 104 load (e.g., end of the work day for a friend finder application).

In view of the above, it would be desirable to have an application based on in network "push based" or spatial trigger capability. Such a trigger capability would automatically detect proximity events and alert the applications. For example, a user could be notified if a friend is within 1 mile of the user's current location between 3–5 P.M. so that the user can invite the friend to a game of golf. Alternatively, the user could be notified if the user's child leaves the school premises during school hours on weekdays. Further, a coffee shop owner could be notified that a preferred customer is within walking distance and mail out a discount coupon over the wireless network 100 to the customer (thus attracting immediate business). Prior art wireless networks 100 lack such capabilities. Further, the lack of such capabilities creates the aforementioned problems.

SUMMARY OF THE INVENTION

A method, apparatus, and article of manufacture enable the use of location based applications while minimizing polling of mobile stations. To provide such functionality, spatial trigger capabilities are incorporated into a wireless network.

A location server on a wireless network receives spatial trigger requests/information for one or more triggers from a location based application located outside of the wireless network. The trigger information provides various trigger details that enable the location server to provide the trigger capabilities. Further, the trigger information may be stored in a persistent datastore that may be temporally indexed. Such temporal indexing provides the ability to filter out triggers that are not currently active. For example, a tennis player, Tim, could use temporal indexing to learn about tennis partners in his vicinity from 7–9 in the evening (such an alert would be temporally active for only a 2 hour period).

The trigger information in the persistent datastore includes various elements such as a source locatable that specifies an object of interest. The trigger will be activated when the user is within the proximity of this source locatable (and also meets other conditions that may be specified). The source locatable may be either a mobile locatable or a fixed locatable. If the source locatable is a fixed locatable, the location of the fixed locatable is defined by a coordinate pair or a street address. If the source locatable is a mobile locatable, the location of the mobile locatable is described by an identifier (e.g., an MSISDN) of the mobile device. Further, if the source locatable is a mobile locatable, during the evaluation process, the updated location of the mobile locatable is retrieved (e.g., using the identifier).

The trigger information also includes spatial information that defines spatial criteria for a target locatable or mobile station that will activate the trigger. Such spatial information may be a start stop filter that detects if the target locatable in motion has come to a halt or if a stationary target locatable has started moving. Alternatively, the spatial information may define a buffer around a target locatable (e.g., a radius or polygon) (referred to as a buffered locatable filter). In such an embodiment, the buffered locatable filter includes a reference to the target locatable (which may be a mobile locatable) (e.g., an MSISDN) and a buffer definition (e.g., a radius for a buffer distance or a polygon definition). Further, the target locatable may comprise dynamic content that changes over time such as a weather condition, traffic congestion, etc. In such an embodiment, the trigger information may determine if the dynamic content/target locatable is approaching a source locatable.

The trigger information further includes a notification flag that describes an interaction between the locatable and the spatial criteria that will cause an alert. Such interactions may be defined as an entry for detecting when the target locatable (e.g., a mobile station) enters a defined area around the locatable, exit for detecting when the target locatable exits the area around the locatable, or crossover for detecting an exit or an entry.

Lastly, the trigger information may include temporal information that defines a time period for which the trigger will be active. For example, the temporal information may be an active temporal filter that defines a period of time that starts now/immediately and ends at a defined time (e.g., in 45 minutes or at 5:00 P.M.). Alternatively, the temporal information may provide a scheduled or fixed period of time.

The location server first determines if the one or more triggers are active based on the temporal information. In other words, the location server (or a trigger manager of the location server) examines the temporal information to determine if the trigger is currently active or if the defined temporal period has not yet occurred (or occurred in the past) (e.g., using the temporally indexed persistent datastore).

Further evaluation for determining if the trigger is active may be based on spatial information. For example, a location area for the target locatable may be obtained from a passive database. A passive database is a database maintained by the wireless operator/network that stores such location information when the target locatable completes a call, sends a text message, switches cellular areas, etc. The obtained location area may then be compared to a location area index for the trigger. Such a location area index defines the various location areas in or around the source locatable that may serve to activate or cause a trigger event to occur (i.e., whether a target locatable is "in or around the area" specified by the spatial information of the trigger. If there is no match, the corresponding triggers may be filtered out from consideration and are not considered "active" filters.

If the trigger is active, the active triggers are added to an in-memory trigger cache and the location server obtains an updated location of the target locatable(s) identified in the spatial filter (e.g., by polling the individual target locatables). The updated location may be stored in a spatially indexed cache that provides the ability to filter out target locatables that are not in proximity to the source locatable as specified in the spatial information. Thus, in addition to the location area filtering, further filtering of the target locatables may be based on the target locatable(s)' updated locations.

The invention may also provide the ability to estimate the future/updated location of the target locatable(s). Such an estimate may be based on a previous location of the target locatable, a timestamp of the previous location, and a velocity estimated from successive locations. The estimate may also take into account a street network, anticipated route, and/or traffic conditions. Further, the estimate may be based on the history and profile of the target locatable such as prior routes taken, prior locations visited, etc.). Accordingly, various location hypercube instances (one instance for each target locatable) may be created. Each hypercube instance provides a coordinate pair identifying the location of the target locatable, a time stamp at which the coordinate pair was recorded, and an estimated velocity of the target locatable. The hypercube instances may also be spatially indexed and used as described above. Thus, in addition to (or instead of) using the actual updated locations of the target locatables, the invention may estimate the location of the target locatables based on prior knowledge. Such an estimate enables the use of complex queries, improved performance, and scalability.

The location server then evaluates the active triggers by determining if a trigger alert has been caused by the source locatable interacting with the target locatable(s) in accordance with the spatial information and notification flag. Lastly, if the alert has been caused, the location server pushes a location answer (i.e., the location of the target locatable that has satisfied or caused the trigger alert to occur) to the location based application outside of the network

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide for the incorporation of spatial trigger capabilities into a wireless network. To provide such functionality, spatial trigger management, spatiotemporal queries, indexing capabilities, and indexing are built into the wireless network. In addition, passive location databases and location hypercube based estimated locations are used to filter out spatial triggers that do not need to be evaluated and to eliminate polling individual mobile stations. Based on the invention, individual applications are not required to replicate custom mechanisms for implementing location triggers, caching, and indexing. Further benefits may include increased usability, ease/elegance of application building, and a reduction in requests received by the wireless network to conduct polling (by orders of magnitude) (thereby reducing hardware requirements and cost).

Hardware Environment

Figure 1:
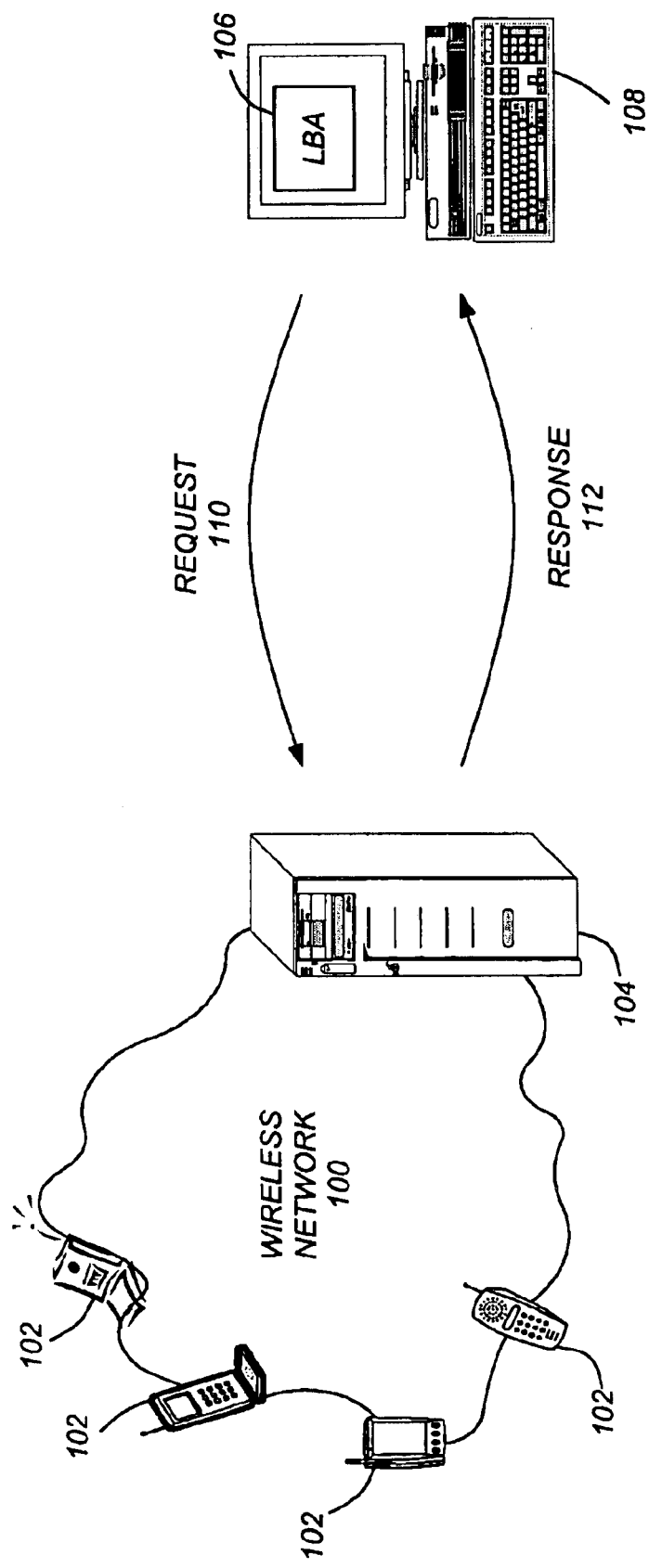
FIG. 1 illustrates the configuration for a prior art wireless network and location based application.
Figure 2:
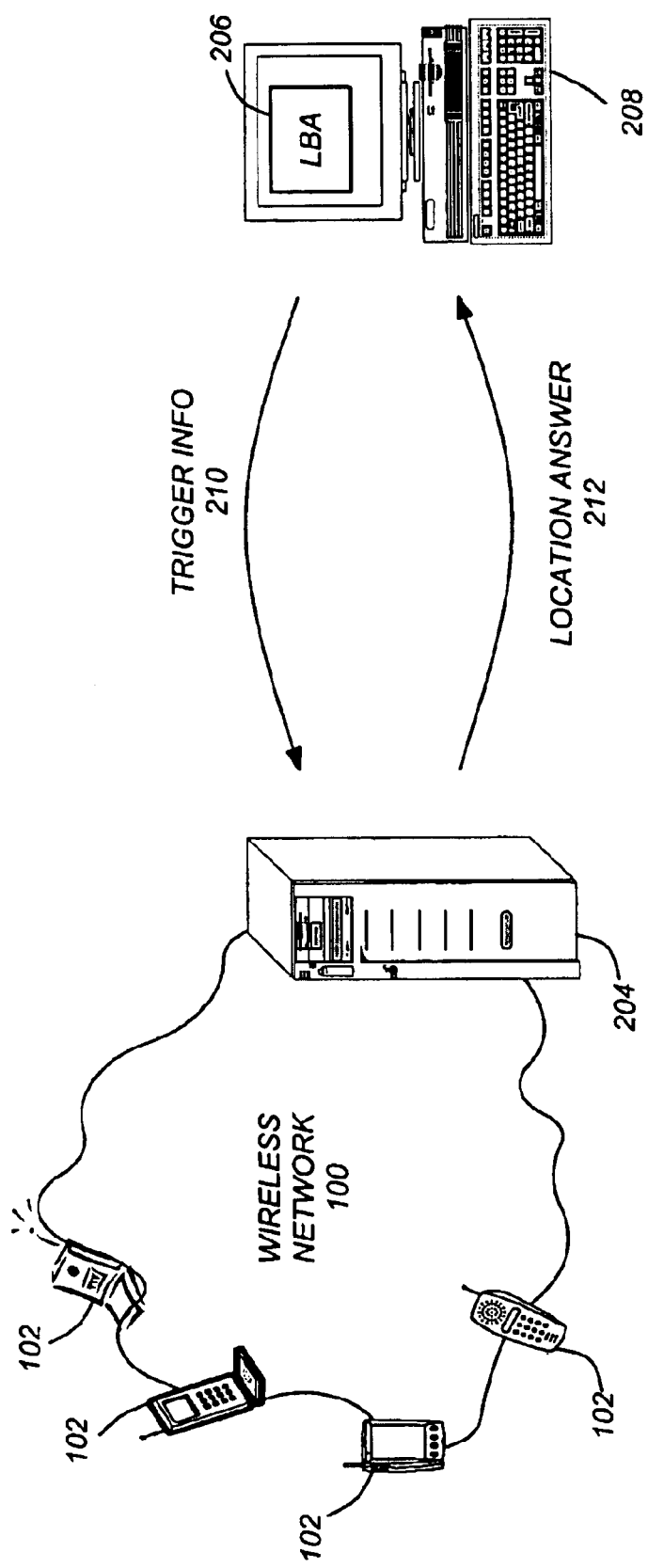
FIG. 2 schematically illustrates a hardware and software environment in accordance with one or more embodiments of the invention.

FIG. 2 schematically illustrates a hardware and software environment in accordance with one or more embodiments of the invention, and more particularly, illustrates the communication between a wireless network 100 and a location based client 208. A typical combination of resources may include a wireless network 100 that includes wireless devices/mobile stations 102 (e.g., mobile phones, wireless personal digital assistants, etc.) and a location server 204 (that may have various enhancements/capabilities as described in detail below), and location based clients 208 executing a LBA 206. Location server 204 and location based client 208 may be personal computers, workstations, minicomputers, or mainframes. Additionally, both location server 204 and location based client 208 may receive input (e.g., cursor location input) and display a cursor in response to an input device such as a cursor control device.

Location based client 208 may communicate with location server 204 utilizing radio frequency (RF), infrared (IR), other wireless based communication mechanism, ethernet, satellite, cable, other wired communication mechanism, or a combination of both wireless and wired communication mechanisms (e.g., across the Internet or an Intranet).

In addition, location server 204 may communicate with wireless devices 102 (also referred to as mobile stations or target locatables) on a wireless network 100. Within a wireless network 100, a service area is divided into cells, each of which has the necessary equipment to switch, transmit, and receive calls to/from any mobile station 102 located in the cell. A transceiver in each mobile station 102 can transmit and receive a plurality of FM channels in a specified frequency range simultaneously.

A mobile station 102 often consists of a control unit, a transceiver, and appropriate antennas. The transceiver contains circuits that can tune to any of the channels assigned to the wireless network 100. Each mobile station 102 has a unique electronic serial number (ESN). Additionally, each mobile station 102 may be assigned a 10-digit mobile identification number (MIN) (also referred to as a mobile subscriber ISDN—or MSISDN) identical in form to any other telephone number.

Users of the mobile station 102 dial the local or long-distance number where applicable, as if calling from a fixed telephone. The cellular customer is typically charged a monthly connect charge as well as air-time usage charges for either incoming or outgoing calls.

The mobile stations 102 are interconnected and controlled by a central Mobile Telecommunications Switching Office (MTSO) across a signaling system 7 (SS7) network. The MTSO is basically a telephone switching office as far as hardware is concerned, but includes a substantial amount of additional digital equipment programmed for cellular control. The MTSO not only connects the system 100 to the land telephone network (the SS7 network), but also records call information for billing purposes. SS7 is the protocol used in the public switched telephone system for setting up calls and providing services. SS7 sets up and tears down the call, handles all of the routing decisions, and supports all modem telephony services such as 800 numbers, call forwarding, caller ID, and local number portability (LNP).

A wireless network 100 provides cellular service in a particular region or area and may include one or more MTSOs to provide the cellular service. A mobile station 102 is associated with a particular wireless network 100 as a home location/area. When a mobile station 102 is taken outside of the home location or into another wireless network 100 area, the mobile station 102 is "roaming". The interim standard-41 (IS-41) is the protocol for passing cellular subscriber information from one carrier/wireless network 100 to another to provide roaming capabilities. Accordingly, IS-41 allows mobile travelers to roam across the country.

A message must be sent from a mobile station 102 to the mobile station's 102 serving home location register before service is allowed when roaming. Such a message registers the phone in the foreign wireless network 100. When the mobile station 102 is taken into a foreign wireless network 100, a message is transmitted to an MTSO in the foreign network 100. The foreign network 100 recognizes that the mobile station 102 is from a different network 100 and requests validation of the mobile station's 102 service from the mobile station's 102 home wireless network 100. Once validated, the mobile station 102 may be permitted to make and receive calls while in the foreign network 100.

As part of service activation in a particular wireless network 100, and as calls or messages are transmitted by a mobile station 102, various telemetry messages may be transmitted between mobile stations 102 and the wireless network 100. For example, a telemetry message such as a registration notification message or remote feature activation message may be utilized to indicate a mobile station's 102 availability on a wireless network 100. When a mobile station 102 moves to a different wireless network 100 or powers on or off the mobile station 102, a telemetry message is delivered to the appropriate wireless network 100. Once a wireless network 100 receives a telemetry message, the message can be forwarded, reformatted, or generally acted upon in some manner.

Information contained within the various telemetry messages may also be stored by the wireless network 100 in a passive database (e.g., that may be located within the location server 204 on a particular wireless network 100 [e.g., on the mobile station's 102 home wireless network 100]). For example, the passive database on a wireless network 100 may store a MIN and a location area (e.g., the particular wireless network 100) where the mobile station 102 is located. This passive database may be used by the location server 104 as described in further detail below.

Generally, these components 100, 102 and 204–208 all comprise logic and/or data that is embodied in or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

General Software Embodiments

As illustrated in FIG. 2, a location services client 208 communicates with a wireless network 100 via location server 204. As described above, in the prior art, individual LBAs 206 had to each be configured to obtain the locations of mobile stations 102. In this regard, voluminous requests were transmitted from LBA 206 to wireless network 100.

In one or more embodiments of the present invention, the location server 204 is enhanced such that the location server 204 is enabled with trigger based functionality/capability. Thus, instead of individual LBAs 206 controlling and determining when a trigger has been activated (by constantly requesting/polling mobile station 102 locations), such functionality is maintained and determined on/by the location server 204. In this regard, FIG. 2 illustrates the location services client 208 providing the trigger request/information 210 to the location server 204. The location server determines when the trigger event/condition has been met. Once triggered, the location answer 212 is provided/transmitted to the LBA 206 on the location services client 208.

Similar to the prior art, such trigger information 210 and location answers 212 may be transmitted in a mobile location protocol. Such a protocol provides an application programmer's interface (API) to the location server 204. The API may be based on existing and well-known Internet technologies such as HTTP, SSL/TLS, HTML, XML, and may be used in an object-oriented environment. Thus, communications between the hardware devices illustrated in FIG. 2 may be stored and transmitted in the form of objects having methods and attributes.

In view of the above, embodiments of the invention provide for a "push based" or location trigger capability. Such a trigger capability automatically detects proximity events and alerts the LBAs 206 when appropriate. For example, an LBA 206 may instruct the location server 204 to notify the LBA 204 if a first friend/mobile station 102 is within 1 mile of a second friend/mobile station 102 between 3:00 PM–5:00 PM so that the first friend may invite the second friend to a game of golf or dinner. Alternatively, an LBA 206 may be notified if a user's child/mobile station 102 leaves the school premises during school hours on weekdays. In yet another embodiment, an LBA 206 may be enabled to determine when a preferred customer/mobile station 102 is within walking distance of a coffee shop so that the coffee shop can mail out a discount coupon over the wireless network 100 to the customer (thus attracting immediate business). In an additional embodiment, the location server 204 may determine if dynamic content (e.g., a weather condition such as a storm or traffic congestion) approaches a fixed location (e.g., a golf course). Such functionality is enabled through various mechanisms as described in more detail below.

Triggers

Requests from LBA 206 to the location server 204 optionally include a trigger or trigger information 210 that specifies the conditions under which alerts will be generated and pushed back to the LBA 206 (i.e., in the location answer 212) or to a user.

Figure 3:
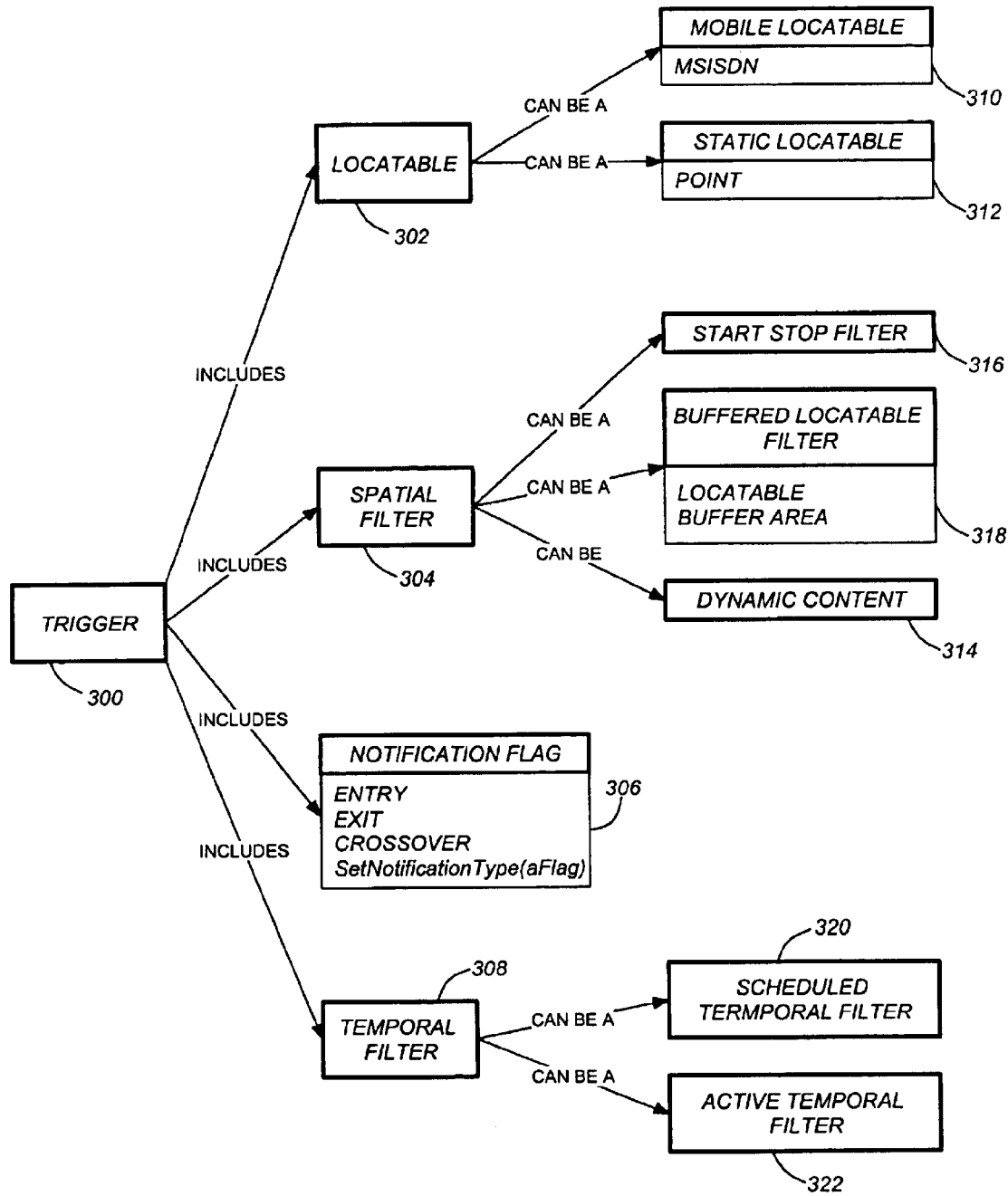
FIG. 3 illustrates a trigger model in accordance with one or more embodiments of the invention.

FIG. 3 illustrates a trigger model in accordance with one or more embodiments of the invention. The trigger 300 specifies various properties/methods/attributes that can be used by location server 204. As illustrated in FIG. 3, trigger 300 may include (or may be required to include) source locatable 302, spatial filter 304, notification flag 306, and temporal filter 308.

Source locatable 302 is the object of interest for the trigger 300. The source locatable may also be viewed as the source object for a trigger 300. The trigger 300 may be activated when a user is within the proximity of the source locatable 302 (and also meets other conditions that may be specified). The source locatable 302 can be a mobile locatable 310 or a fixed/static locatable 312. A mobile locatable 310 may be described by the MSISDN of another device (s)/user(s) (e.g., the location of a mobile device with an MSISDN 4678123456789). A fixed locatable 312 is described by a coordinate pair (x,y)/point such as the location of a restaurant or a street address. In addition, it should be noted that if the incoming coordinates for a fixed locatable 312 are in ellipsoidal format (e.g., geographic latitude-longitude), the coordinates may be projected to a planar coordinate system that minimizes scale and distance distortion in the vicinity of the points (e.g., a tangential projection centered at the target point).

The spatial filter 304 describes the spatial criteria that will activate the trigger 300. The spatial filter 304 can be a start stop filter 316, a buffered locatable filter 318, or dynamic content 314. The start stop filter 316 is used to detect if the source mobile locatable 310 in motion has come to a halt, or if the source stationary mobile locatable 310 has started moving (e.g., this can be used to measure halts made by a fleet truck).

The buffered locatable filter 318 describes a buffer around a second locatable 302 (also referred to as a target locatable 302). The buffered locatable filter 318 includes a reference to the target locatable 302 and identifies a buffer area such as a radius distance or polygon. For example, the buffered locatable filter 318 may specify a 1000 meter radius buffer around a restaurant located at (x,y), or 500 meters radius buffer around a mobile device with an MSISDN 46708123456789 (thus representing a moving spatial buffer). Alternatively, the buffer area may describe a fixed polygon such as a school boundary.

Dynamic content 314 describes a target locatable that changes over time (e.g., traffic congestion on a route, a weather event such as a storm, etc.)

Accordingly, the spatial filter 304 may include a reference to a target locatable and provide spatial information relating to that target locatable. The framework allows the source locatable 302 and target locatable to be interchangeable. Thus, the general framework allows detecting of specified spatial relationships at specified time periods between mobile-to-fixed, mobile-mobile locatables, or mobile/fixed to dynamic content 314. In view of the above, the trigger 300 may identify both a source locatable 302 and a target locatable (e.g., within spatial filter 304). Thus, the trigger 302 may be based on the spatial relationship between the source and target locatables.

The notification flag 306 describes the interaction with the spatial filter 304 that will cause an alert or notification to occur. For example, notification flag 306 may have a value of ENTRY for detecting when the source locatable 302 (or target locatable) enters a buffer area (e.g., when a mobile device enters a polygon), EXIT for detecting when a source locatable 302 (or target locatable)) exits a buffer area (e.g., when a mobile device exits a polygon), or CROSSOVER for detecting an EXIT or ENTRY of the source locatable 302 (or target locatable) into the buffer area.

Temporal filter 308 describes the time periods for which the trigger 300 will be active. The temporal filter 308 can be a scheduled temporal filter 320 or an active temporal filter 322. The scheduled temporal filter 320 is used to describe scheduled or fixed periods of time (e.g., Monday, Wednesday, and Friday 8–9 A.M. and 6–7 P.M.). The active temporal filter 322 is used to describe a period of time that starts now (or immediately active) and extends for a defined period of time (e.g., active for the next 45 minutes).

The combination of a source locatable 302, spatial filter 304, and temporal filters 308 can create triggers 300 that can be used in many elegant applications. The information within the trigger 300 provides the ability for a notification/alert based on a spatial relationship between a source and target that is monitored within a defined temporal range. For example, a user may be notified if his/her child leaves the school premises during school hours Monday to Friday (referred to as a boundary use case). Alternatively, a cafe may be notified if a preferred customer is within 500 meters (referred to as a point alert use case). A golf club may be notified if members are within 1000 meters of the club on Saturdays, between 12 to 4 P.M. (referred to as a bubble alert use case), or if a storm front is approaching the golf course in 2 days. Further, a business may be notified if the business' fleet truck starts moving after an extended halt (referred to as a tracker use case). Another common use case is for a user or mobile device looking for a buddy/friend or location nearby.

Trigger Management

Figure 4:
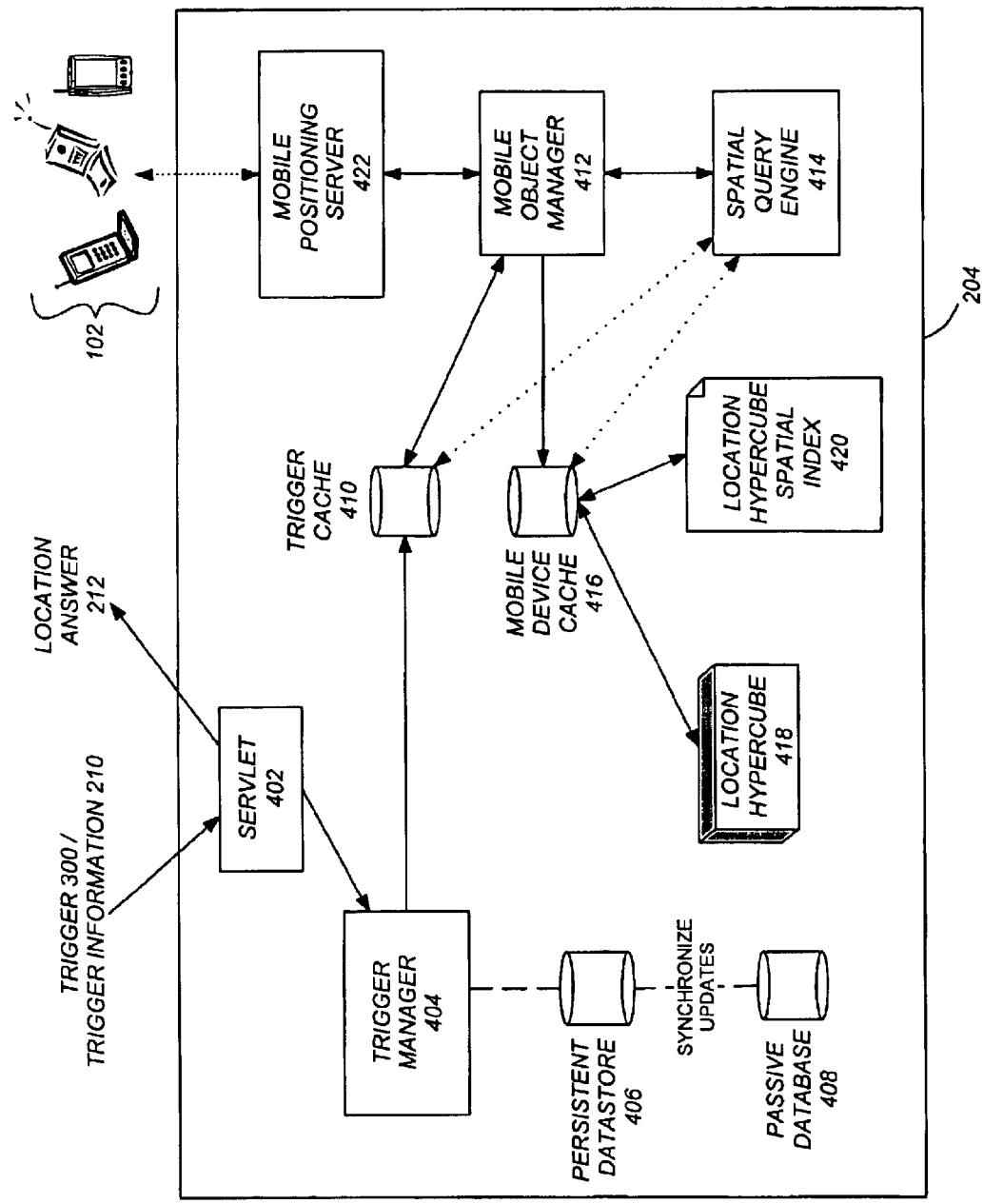
FIG. 4 illustrates the various components of a location server in accordance with one or more embodiments of the invention.

FIG. 4 illustrates the various components of a location server 204 in accordance with one or more embodiments of the invention. The design model provides a combination of persistent and in-memory structures. The in-memory structures support frequent updates to the information (e.g., device 102 location) and avoid database roundtrips to obtain frequently accessed trigger information.

The trigger 300/trigger information 210 is received by the servlet 402 within location server 204. Once the trigger 300 is received, servlet 402 uses the trigger manager 404 to parse and persist the scheduled triggers in persistent datastore 406. The persistent datastore 406 may be a relational database management system (RDBMS) that provides the ability to conduct queries and manipulation of the data in the datastore 406. Further, the persistent datastore 406 provides spatio-temporally indexed triggers. In this regard, the trigger data within datastore 406 is temporally indexed and is also indexed by location area.

To utilize the spatio-temporally indexed information within persistent datastore 406, the trigger manager 404 examines the temporal aspects of the triggers 300 within the persistent datastore 406 to determine the triggers 300 that are currently active. In this regard, an asynchronous (background) process of the trigger manager 404 will periodically scan the persistent datastore 406 for all triggers 300 that are currently active based on the temporal filter 308. The periodicity may be configurable (e.g., every two (2) minutes). Since the persistent datastore 406 is temporally indexed, the triggers 300 may be searched and accessed efficiently. If a trigger 300 is not currently active, no further analysis is necessary.

If a trigger 300 is currently active, the background process of trigger manager 404 may add the active trigger 300 to the in-memory trigger cache 410.

In one or more embodiments of the invention, the persistent datastore 406 interacts with (and updates are synchronized with) a passive location database 408. As described above, the passive location database 408 collects and stores the location(s) of a target locatable (e.g., mobile device(s) 102). For example, the location of a mobile device 102 may be stored each time a call is made or an SMS (short message service) is sent from the mobile device 102. However, the location collected and stored is generally not the exact location. Instead, the location may identify a location area such as the cellular station or cellular network that the mobile device 102 is located within. Additionally, the location area may provide the mobile device ID (e.g., the MSISDN), or a mobile device ID plus a TA (timing advance) value.

Using the information in the passive location database 408, the trigger manager 404 filters out triggers that need not be processed and thereby avoids polling the mobile stations 102 numerous times (thereby providing high throughput). In other words, once the trigger manager 404 uses the persistent datastore 406 to determine that a trigger 300 is currently active (based on the temporal indexing), the trigger manager 404 looks to the passive database 408 to determine if the various mobile stations 102 are within the location area identified in the trigger. By using the passive database 408 in this manner, additional polling of the individual mobile stations 102 (for the exact location) may be avoided until the location area of the individual mobile stations 102 are within the scope of an active trigger 300.

Figure 5:
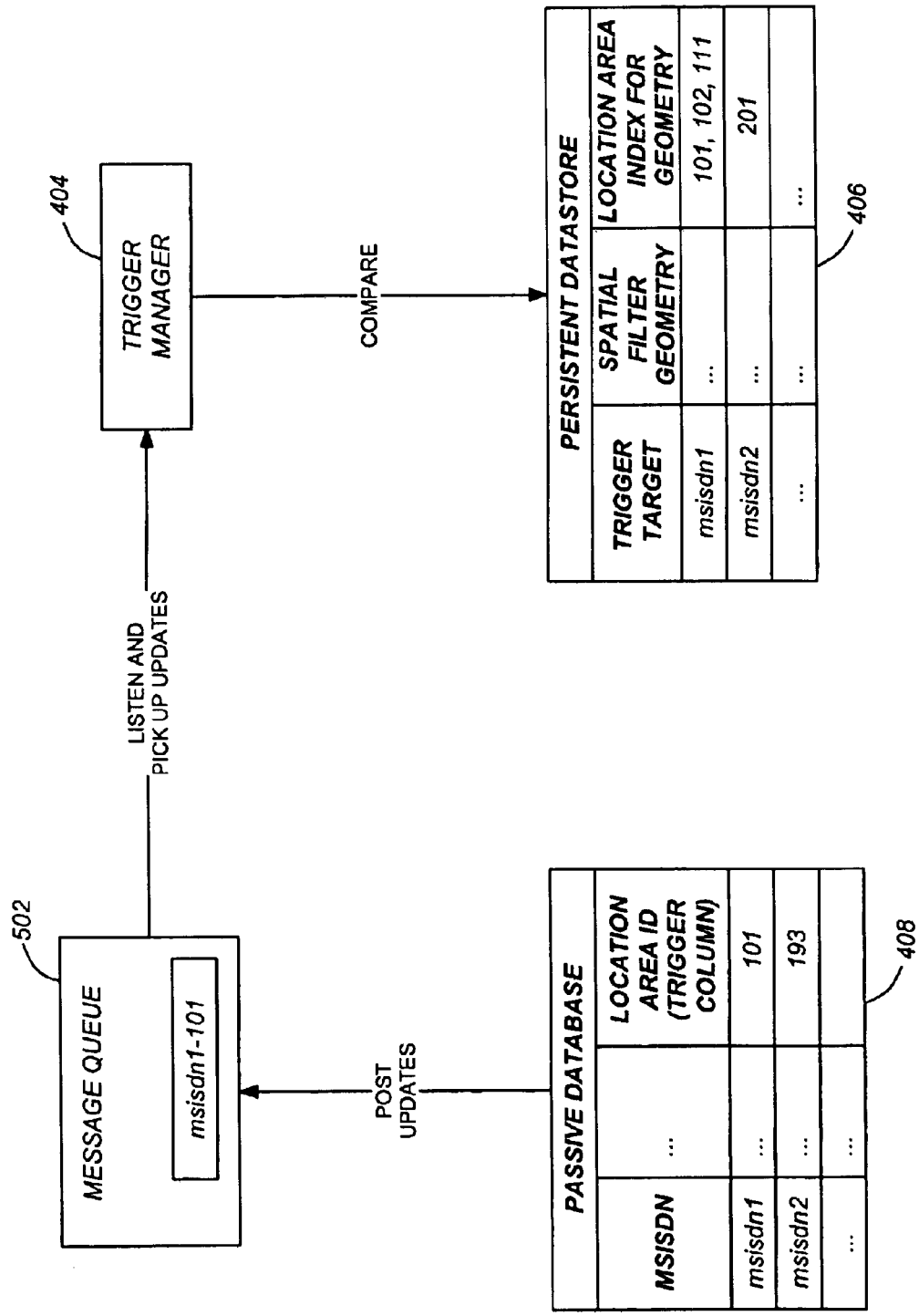
FIG. 5 illustrates the interaction/synchronization of updates between a persistent datastore and a passive location database in accordance with one or more embodiments of the invention.

The interaction/synchronization of updates between the persistent datastore 406 and the passive location database 408 is further illustrated in FIG. 5. As described above, the databases may be relational databases such that SQL (structured query language) triggers and queries may be utilized. As illustrated in FIG. 5, the passive location database 408 identifies the mobile device 102 (e.g., by the MSISDN) and the latest location area of the mobile device 102.

The first time a trigger 300 is temporally active, the passive database 408 may be checked to determine if it contains a location for a mobile station 102. The passive location database 408 then posts location area updates to a message queue 502 asynchronously. For example, when the location area is updated in the passive location database 408, the passive location database 408 posts those updates into a message queue 502 (e.g., posts the MSISDN number and location area).

The trigger manager 404 is configured to listen to the message queue 502 and picks up the updated location areas from the message queue 502. The trigger manager 404 then checks to see if the updated location area is contained in the location area indexes of active triggers. If the passive database indicates is not active, the trigger is not added to the cache. If the user at a later point, moves to a new location area, the passive database As illustrated in FIG. 5, the persistent datastore 406 maintains the locatable (either source and/or target) of the trigger 300 (i.e., a specific mobile device 102), a spatial filter geometry (such as a defined buffer area), and one or more location areas that may satisfy or activate the trigger (e.g., location areas 101, 102, 111, and 201). The various location areas may be broader and incorporate an area larger than the area defined by the spatial filter 304. For example, suppose the locatable 302 is defined as a static locatable 312 (e.g., a restaurant) within a particular single cellular area (but close to the border of the cellular area). The location area index within the persistent datastore 406 may list the cellular area containing the locatable 302 and adjacent cellular areas.

The trigger manager 404 then compares the location area from the passive location database 408 to the list of location areas in the persistent datastore 406 to determine if any matches exist. If (and only if there is a match), the trigger manager 404 proceeds (e.g., performs additional evaluation of the trigger). Thus, as illustrated in FIG. 5, the persistent datastore 406 may store a location area index for the spatial filter associated with each trigger 300 (e.g., in a boundary use case, the persistent datastore 406 stores the location areas that overlap the boundary polygon). The updates to the passive database 408 may be synchronized with the persistent datastore 406 and trigger manager 404 using SQL trigger constructs.

The updates (i.e., in the message queue 502) from the passive database 408 are used to check if a mobile device 102 is "in or around the area" specified by the spatial filter 304 in the trigger 300. If the test fails, the trigger 300 will not be evaluated, and the mobile stations 102 will not be polled for more accurate locations.

If the test (of the location area) is successful (i.e., a mobile station 102 is "in or around the area" specified by the spatial filter 304), a more accurate location may be obtained by periodically polling the mobile stations 102.

In addition to the above, the frequency of polling individual target locatables 102 may be configurable based on the quality of service required by the application. An example of varying the frequency of polling may arise when a passive database 408 is not available or does not contain a location for a target locatable 102. In such a scenario, the individual target locatables 102 may be polled to obtain an initial location. Thereafter, if the location is significantly outside of the area defined in a trigger, the target locatables 102 may not be polled for 1 hour, 2 hours, or more. For example, if the initial location of a target locatable 102 identifies the location of the target locatable 102 on the West coast and the trigger 300 requires an area on the East coast, the target locatable 102 may not be polled for an updated location for several hours.

Referring again to FIG. 4, when successful, the trigger manager then populates the in-memory trigger cache 410 with the active triggers (i.e., in an active trigger list maintained in the trigger cache 410). Thus, unless the passive database 408 use provides a match and the temporal filter 308 indicates an active status, the trigger 300 may be considered inactive and is not populated in the trigger cache 410. Using the information from the trigger 300, the trigger cache 410 obtains a list of the currently active target locatables 102.

The mobile object manager 412 is configured to obtain the list of active target locatables 102 (e.g., the active MSISDNs) from the trigger cache 410. Using the list of active target locatables 102, the mobile object manager 412 obtains/polls the individual target locatables 102 through the mobile positioning server 422 (e.g., across a wireless network) for their locations. The mobile positioning server 422 may determine the locations after being provided a list of identifiers (e.g., MSISDNs) for the various target locatables 102. In one or more embodiments, mobile positioning server 422 utilizes E-OTD technology to determine the target locatable 102 locations. The E-OTD method is based on measurements in the target locatables of the Enhanced Observed Time Difference of arrival of bursts from nearby pairs of base stations.

The locations of target locatables 102 that are referred to by the active triggers 300 are cached in-memory (i.e., in mobile device cache 416). Such caching is useful due to the frequency of updates of location, timestamp, etc. The information cached within mobile device cache 416 may also include the current and previous locations of target locatables 102, and the reference to triggers 300 that refer to these target locatables 102.

The mobile object manager 412 utilizes the spatial query engine 414 to resolve spatial queries. The spatial query engine 414 is responsible for conducting the actual comparison or spatial evaluation to determine if a trigger event has occurred. In an asynchronous (background) process, the spatial query engine 414 periodically evaluates which triggers 300 will produce alerts (also called events) based on the current and previous locations of the target locatables 102 (i.e., stored in the mobile device cache 416). The periodicity may be configurable based on the use case (e.g., every 5 minutes). Thus, the spatial query engine utilizes the in-memory trigger cache 410 and the in-memory mobile device cache 416 to perform the evaluation.

Only target locatables 102 whose locations have changed or are being referred to by a new trigger request may be evaluated by spatial query engine 414. Queries performed by spatial query engine 414 may include (1) a proximity or within distance query, or (2) buffer area containment (e.g., is object within a defined polygon or radius). Queries may also be extended to detect nearest neighbor, reverse nearest neighbor, etc.

Spatial Indexing and Location Hypercube

Figure 6:
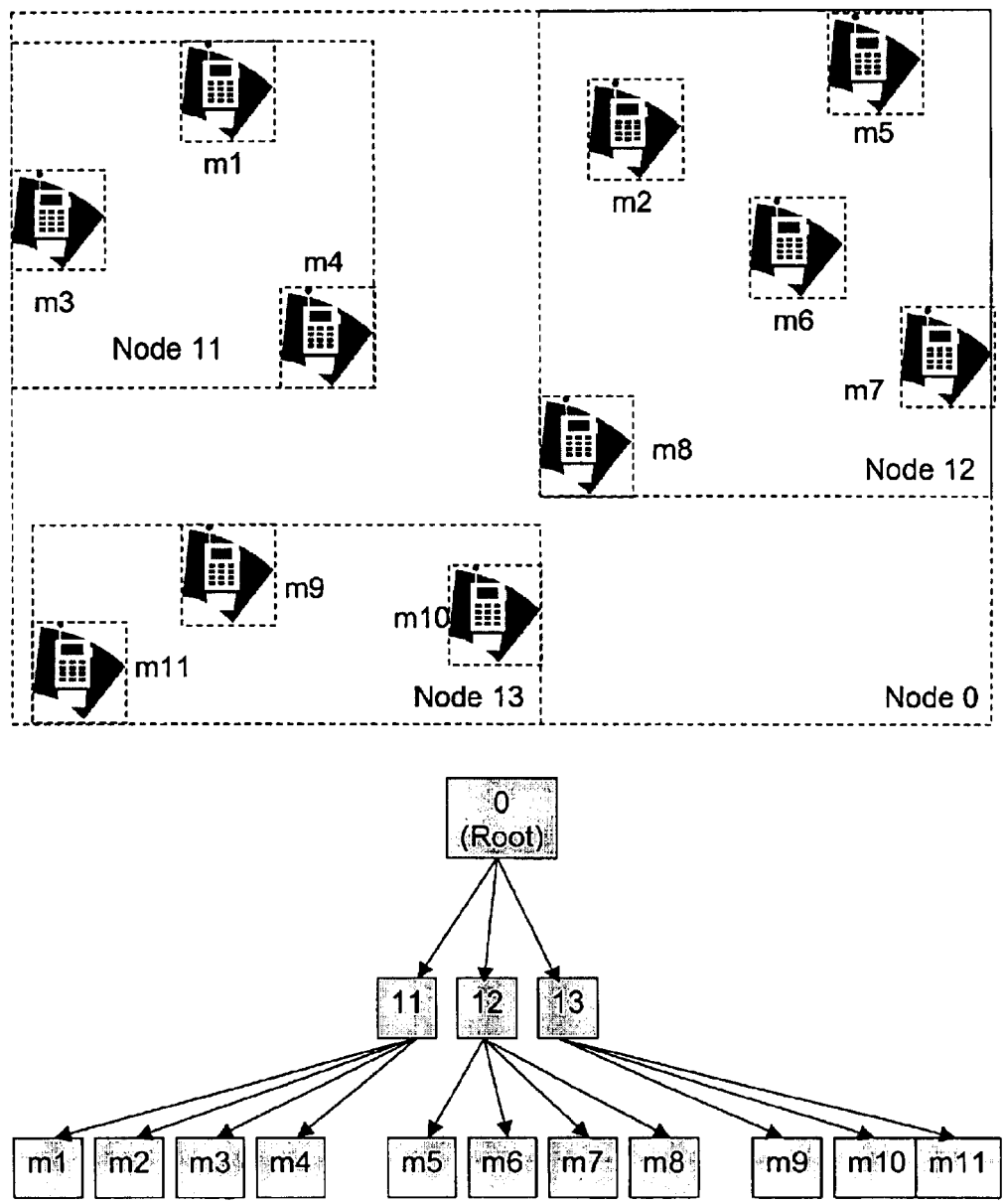
FIG. 6 illustrates how various mobile devices are organized into a hierarchical R-Tree index in accordance with one or more embodiments of the invention.

For improved performance and scalability (ranging up to several million devices 102), the mobile device cache 416 may use location hypercubes 418 and an in-memory spatial index 420. The spatial index 420 may be based on R-trees to allow filtering of devices that are not in the proximity of the spatial filter 304. FIG. 6 illustrates how various target locatables 102 are organized into a hierarchical R-Tree index. As illustrated, the various cellular areas (referred to as nodes) contain various target locatables 102. The listing of target locatables 102 are indexed based on their location (i.e., cellular area/node).

The illustrated R-tree index is a hierarchical tree based spatial indexing scheme that offers several benefits for indexing dynamically changing data (e.g., mobile device 102 locations). In this regard, the total extent is not fixed and can grow. Further, the cell sizes (i.e., nodes) are not fixed and can dynamically be reshaped to suit the current distribution of the target locatable 102 locations. There is a greater division of cells in areas where larger number of target locatables 102 are located (e.g., urban downtown). Further, for a typical distribution, when analyzing the data, only a third or less of the nodes may have to be actually visited, resulting in significant performance gains. In addition to the above, while R-trees typically deal with two or three dimensional (x,y,z) coordinate information, they can be extended to index n-dimensional objects.

In addition to indexing the target locatables 102 by location (i.e., spatially), for improved throughput, the target locatable 102 polling frequency may be reduced, and the current location of the target locatable 102 may be estimated using the previous location of the target locatable 102, the timestamp of the previous location, and the velocity estimated from successive locations. To provide such location estimation, one or more embodiments of the invention may utilize a location hypercube 418.

A location hypercube 418 includes an x,y coordinate pair, a time stamp at which the location was recorded, and the estimated velocity of the target locatable 102. Thus, for every locatable 302 identified in a trigger 300 (whether the source or target locatable), a location hypercube 418 may be created/instantiated. In view of the information contained within the location hypercube 418, the location server 204 is able to estimate a location of a target locatable 102 that is moving. In addition, the spatial index 420 indexes the location hypercube instances 418 to provide more efficient processing.

By using the location hypercube 418 as described herein, various queries may be possible. For example, a query of the form "find all devices from my friend group within 1000 meters of my location, for the time interval 1:00–1:15 P.M." or "find friends who will be in my vicinity between 3 and 3:30 P.M." may be executed. Thus, as described, the location of a target locatable 102 may be determined using a hypercube 418 and then placed into a spatial index 420.

Use of Profile, History, and Additional Information

The location of a target or source locatable may also be estimated based on other factors. For example, the estimate may take into account a street network, anticipated route, and/or traffic conditions. Further, the estimate may be based on the history and profile of the mobile station such as prior routes taken, prior locations visited, etc.

Such profile and history use may provide an enhanced method for determining the location of a locatable (source or target). Such location estimation is more fully described in U.S. patent application Ser. No. 10/034,442, entitled "FUZZY LOGIC REASONING FOR INFERRING USER LOCATION PREFERENCES", filed on Dec. 26, 2001 by Nemmara Chithambaram, (which is incorporated by reference herein).

Examples of the use of the profile and/or history include basing the estimated location of the locatable on the prior route traveled, the time of travel, etc. For example, if it is 7:00 AM and the history of the locatable indicates that the locatable commutes to work on a specific route at 7:02 AM, the future location of the locatable may be estimated.

In addition to using the profile and history independently, the profile and history may be combined with the hypercube system to more accurately estimate the location of the locatable. For example, based on the past routes traveled and the current velocity of the locatable, the future location may be more accurately determined.

Smart Filters

Smart filters generally refer to a filter or action that serves to reduce the number of triggers 300 that are evaluated in each scan (i.e., each time the spatial query engine 414 evaluates a trigger 300). Some smart filters were described above.

One example of a smart filter (as described above) is based on temporal information. In such an embodiment, only triggers 300 that are currently active based on the temporal indexing will be retrieved from the persistent datastore 406 and loaded into the trigger cache 410. As described above, if the trigger manager 404 determines that a trigger 300 within the persistent datastore 406 is not temporally active, no further evaluation will be performed.

Another example of a smart filter is that only target locatables 102 whose location has changed since the previous polling/scan (e.g., or a scan of the triggers 300) will be evaluated (e.g., by the spatial query engine 414) for alerts. Thus, if a source locatable is a static locatable 312 and the spatial index 304 indicates that the target locatable has not moved, no further evaluation by the spatial query engine 414 is necessary.

In yet another embodiment, neighborhood filtering (as described above) may be utilized. Such neighborhood filtering may also be viewed as determining the frequency for obtaining an updated location of target locatables 102 based on a spatial relationship between the target and source locatables.

Target locatables 102 that are not in the neighborhood of the spatial filter 304 will not be polled (i.e., at a rapid frequency) for their specific location, and will not be evaluated by the spatial query engine 414. The neighborhood filtering described above may be used in the context of the passive database 408 where the location area is compared to the list of potential/neighborhood location areas stored in the persistent datastore 406. For example, a friend currently located in New York is unlikely to be in the vicinity (1000 meters) of the user in San Francisco in the next 4 hours. Accordingly, the smart neighborhood filter would refrain from polling the New Yorker and evaluating the trigger with respect to the New Yorker (e.g., for several hours).

Thus, as describe above, temporal indexes and spatial indexes may be used to filter out a significant number of target locatables 102 from the alert evaluation.

Use Cases/Examples

The triggers 300 and structure described above may be utilized to provide a melange of capabilities to a location server 204 and LBA 206. Table 1 illustrates some examples of the potential use cases.

TABLE 1

| Name | Description | Reference Application |
| --- | --- | --- |
| Bubble | Two or more phone between x meters of each other | Friend Finder |
| Point Alert | Phone within beyond x meters from an X, Y | Commerce (Coupon Push) |
| Tracker | Smart consecutive positions - mobile moved x meters from a previous position | Fleet Tracking |
| Boundary | Phone entering or leaving a polygon | Child Tracker |
| Start/Stop | Phone start/stop moving | Fleet Tracker & Stolen Vehicle Monitor |

Bubble Use Case

The bubble use case determines if two (2) or more target locatables 102 are within the specified distance of each other. The reference application is a friend finder service where alerts are generated when a target locatable 102 in their target list has come within their pre-defined bubble. For example, an application may notify a user if members of the user's golf club are within 1000 meters on Saturdays, between 12–4 P.M.

Possible variables may include the number of target locatables 102 (e.g., 3, 5, 7, etc.), the number of groups (e.g., co-workers, friends, etc.), the bubble size as a radius in meters, temporal ranges for checking bubble (e.g., lunch, after work, weekends, etc.), and the frequency of the request/polling (e.g., 8 per hour). The temporal range and frequency may be based on a user's profile (e.g., employee, vacationer, etc.) or could be ad-hoc based on the application access plus a period of time.

In addition to the above, filters may be used to limit alerts to mobile locations within a temporal period (e.g., the prior 8 minutes). Such a temporal filter reflects the concept that locations older than the frequency of the request are probably not relevant.

Point Alert

The point alert use case determines if a target locatable 102 is within the specified distance of a commercial establishment (e.g., a cafe or a restaurant). The reference application that would utilize such a trigger is a commerce coupon push application. Further, the point alert trigger could be used by a commercial establishment that desires to know all of the preferred customers within 1000 meters of its location.

Possible variables may include the number of target locatables (e.g., 1), the number of commerce points (e.g., 3), the radius from the establishment, temporal ranges for checking the radius, and the frequency of the request (e.g., 4 per hour) (frequency may be less than the bubble alert due to the nature of the activity). The temporal range and frequency may be dependent on scheduling [e.g., weekend mornings when user runs errands]. Alternatively, the temporal range and frequency may be based on an ad-hoc request such as "I'm going shopping now").

Filters may also be used to limit the alerts to current locations (e.g., within 15 minutes). Such filtering may be based on the concept that locations older than the defined frequency could still be relevant (e.g., dinner coupons with dinner taking 60–90 minutes, shopping sessions at a mall lasting hours, etc.).

Tracker Use Case

The tracker use case determines the difference between the current location of target locatable 102, and its last stationary location. If the difference in positions is greater than a specified value, the trigger 300 may be initiated. The reference application for this use case is a fleet management or enterprise resource management application. Alternatively, this use case may be applicable to dynamic driving instruction applications. For example, a two position query may be used to yield a bearing that could be valuable to dynamic driving instructions. However, such an application may increase the frequency of the target locatable 102 polling (e.g., to 12–30 per hour).

Variables for the use case may include the number of target locatables 102 (e.g., 1), a linear value in meters, a temporal range for checking the bubble (e.g., work hours), and the frequency of the request (e.g., 8 per hour). Similar to the bubble case, the temporal range and frequency may be based on a profile or ad-hoc based on the application access plus a period of time. Further, similar to the other use cases, locations older than the defined frequency may not be relevant to the service.

Boundary Use Case

The boundary use case determines if a target locatable 102 is within or outside of a specified polygon. The reference application for a boundary use case is commonly a child or pet tracker application. For example, an application may provide for notifying a user of the user's child leaves the school premises during school hours Monday to Friday.

Variables may include the number of target locatables 102 (e.g., the user's child), a polygon area, temporal ranges for checking the bubble (e.g., daylight hours or school hours Monday to Friday), and the frequency of the request (e.g., 20–30 per hour; more frequently since the application may be used as a safety service). As with other described use cases, the temporal range and frequency may be based on a profile or ad-hoc based on the application access plus a period of time.

Start/Stop Use Case

The start/stop use case detects if a target locatable 102 in motion has come to a halt, or if a stationary target locatable 102 has started moving. The reference application for this use case is to support a tracker for fleet management, a gaming application, or other triggers and vehicle/asset monitoring.

Variables may include the number of target locatables (e.g., 1), temporal ranges for checking the bubble (may vary based on application), and the frequency of the request (e.g., for a fleet—8 per hour; for gaming—up to 60 per hour; for vehicle/asset monitor—4–6 per hour). The temporal range and frequency may be based on a profile or ad-hoc based on the application plus a period of time.

Trigger Processing

Referring again to FIG. 2, triggers 300 or trigger information 210 may be provided by LBAs 206 to a location server 204 that manages the triggers 300. Once the location server 204 determines that a trigger event has occurred, a location answer 212 may be sent back to the LBA 206.

Figure 7A:
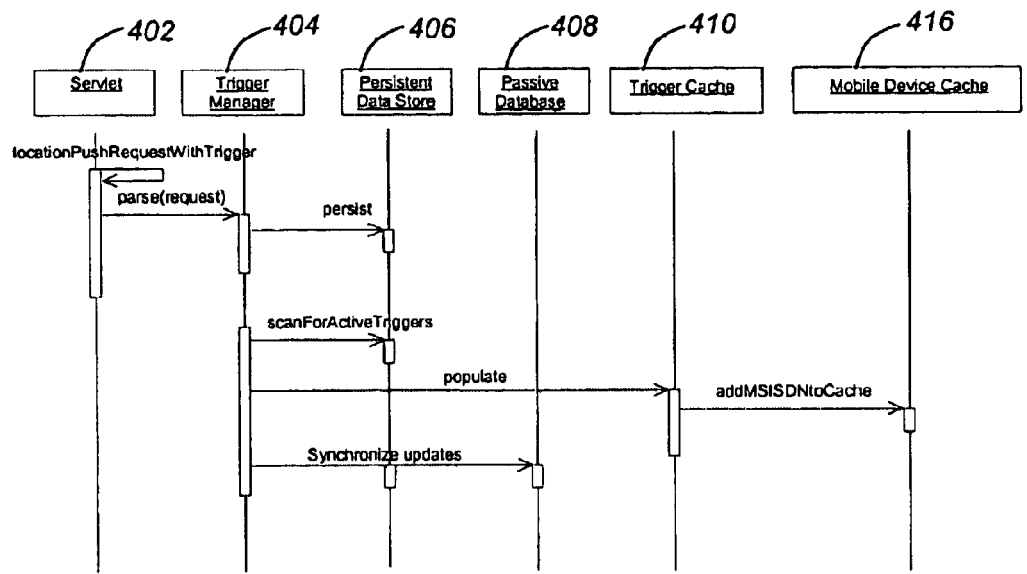
FIGS. 7A–7C illustrate the flow of trigger processing in accordance with one or more embodiments of the invention.
Figure 7B:
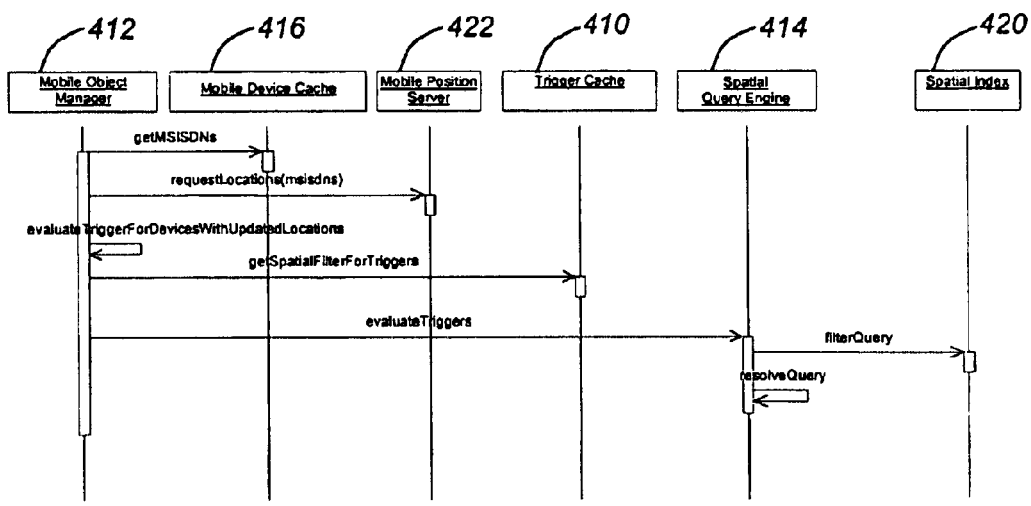
Figure 7C:
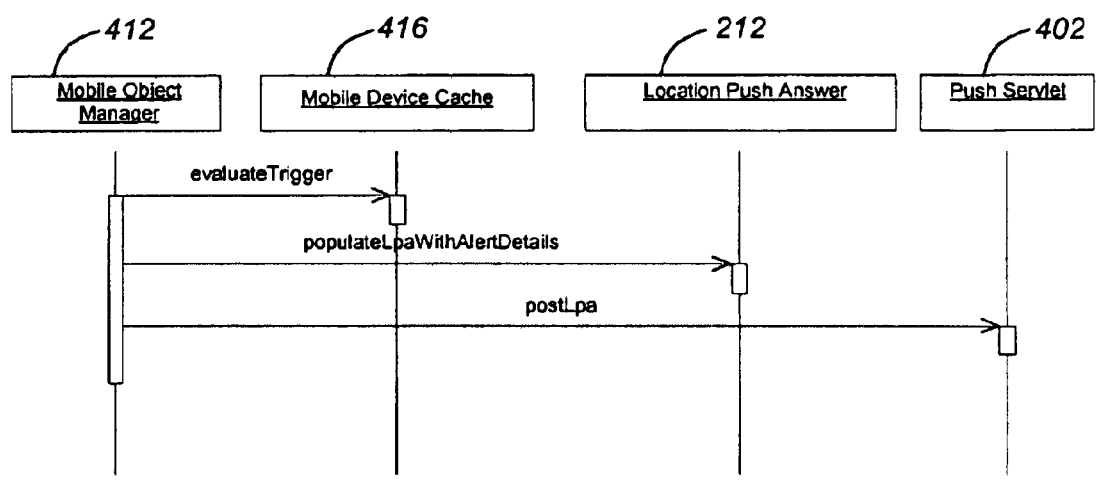

FIGS. 7A–7C illustrate the flow of trigger processing in accordance with one or more embodiments of the invention.

FIG. 7A illustrates trigger 300 management. The servlet 402 forwards the location spatial trigger request (i.e., from the LBA 206) to the trigger manager 404. The trigger manager 404 parses the request and persists the trigger 300 in the persistent datastore 406. In addition, the trigger manager 404 periodically initiates an asynchronous background process that scans the persistent datastore 406' for triggers 300 that are currently active. The active triggers 300 are cached in memory by populating the trigger cache 410. The target locatables 102 referred to by the active triggers 300 are then added to the in memory mobile device cache 416.

As described above, trigger manager 404 may also synchronize updates in the persistent datastore 406 with the passive database 408. Such synchronization may provide for the trigger manager 404 checking to determine if the updated location area (in the passive location database 408) is contained in the location area indices of triggers 300 that are within an active temporal range. If the updated location area is contained in the location areas of an active trigger 300, the trigger manager 404 may then populate the trigger cache 410 with the active trigger 300.

FIG. 7B illustrates the flow of trigger alert processing in accordance with one or more embodiments of the invention. The mobile object manager 412 communicates with a wireless network 100 (e.g., cellular network) and updates the locations for the individual target locatables 102, from the mobile position server 422, that are in the mobile device cache 416. As illustrated, such a process may be completed by retrieving the MSISDNs from the mobile device cache 416. The locations for each of the target locatables 102 are then requested/retrieved.

The mobile object manager 412 then uses the trigger information 300 in the trigger cache 410 (i.e., the spatial filter 304 information) and the updated locations to evaluate if alerts will be generated for the triggers 300. The (inmemory) spatial index 420 and spatial query engine 414 may be used to resolve the query efficiently and determine if alerts are to be generated. As described above, the spatial index 420 may be used in combination with the location hypercube 418 to estimate the location of a target locatable 102 based on the target locatable's 102 speed and prior location.

FIG. 7C illustrates the flow for pushing the location answer 212 to the LBA 206. As in FIG. 7B, the mobile object manager 412 evaluates the trigger using the mobile device cache 416. The location push answer 212 is then populated with the alert details and posted to the push servlet 402. The push servlet 402 is then used to forward/push the location answer 212 to the LBA 206.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention enable the efficient use of location based-services. Various tasks implemented pursuant to the invention may include updating the trigger databases 406, scanning of the trigger database 406 for currently active triggers 300, refreshing the target locatable 102 locations (and/or source locatables 302), and evaluating the triggers 300 current location for alerts that need to be sent to the user/LBA 206. These tasks may be performed concurrently and asynchronously on the available CPUs using a distributed messaging based architecture that will provide for linear scalability across CPUs.

The in-memory caching structures for the active triggers (i.e., trigger cache 410) and locatable locations (i.e., mobile device cache 416) provide the ability for improved throughputs. The spatial index 420 and temporal index (i.e., within persistent datastore 406) also help throughput by reducing the percentage of the database 406 that will have to be processed for the periodic alert scan. Further, smart filters (e.g., using the passive database 408) that eliminate devices 102 that are not within the neighborhood of the spatial filters 304 specified by the triggers further improves throughput. Additionally, a location based hypercube may be used to estimate the locations of locatables 102 and 302.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for enabling in-network location based services, comprising:
   (a) receiving, in a location server on a wireless network, trigger information, for one or more triggers, from a location based application located outside of the wireless network, wherein the trigger information defines:
      (i) a source locatable that specifies an object of interest;
      (ii) spatial information that defines spatial criteria for a target locatable that will activate the trigger;
      (iii) a notification flag that describes an interaction between the source locatable and the spatial criteria that will cause an alert; and
      (iv) temporal information that defines a time period for which the trigger will be active;
   (b) determining if the one or more triggers are active based on the temporal information;
   (c) obtaining an updated location of the target locatable if the trigger is active;
   (d) evaluating the active triggers by determining if a trigger alert has been caused by the source locatable interacting with the target locatable in accordance with the spatial information and notification flag; and
   (e) pushing a location answer to the location based application if a trigger alert has been caused.

2. The method of claim 1, wherein:
   the source locatable comprises a mobile source locatable that defines a location described by an identifier of a mobile device; and
   the evaluating further comprises retrieving an updated location of the mobile source locatable.

3. The method of claim 1, wherein the locatable comprises a fixed source locatable that is defined by a coordinate pair.

4. The method of claim 1, wherein the spatial information comprises a start stop filter that detects if the target locatable has started or stopped moving.

5. The method of claim 1, wherein the spatial information comprises a buffered locatable filter that describes a buffer around the target locatable.

6. The method of claim 1, wherein the temporal information comprises an active temporal filter that defines a period of time that starts now and ends at a defined time.

7. The method of claim 1, wherein the temporal information comprises a scheduled temporal filter that defines a fixed period of time.

8. The method of claim 1, further comprising storing the trigger in a persistent datastore.

9. The method of claim 8, wherein the persistent datastore is temporally indexed.

10. The method of claim 1, wherein determining if the trigger is active is further based on spatial information comprising:
   obtaining a location area for the target locatable from a passive database;
   comparing the location area to a location area index for the trigger; and
   filtering out triggers if the location area is not within the location area index.

11. The method of claim 1, further comprising adding active triggers to an in-memory trigger cache.

12. The method of claim 1, further comprising storing the updated location in a spatially indexed cache that provides the ability to filter out target locatables that are not in proximity to the source locatable as specified in the spatial information.

13. The method of claim 1, wherein obtaining the updated location comprises estimating the updated location of the target locatable using a previous location of the target locatable, a timestamp of the previous location, and a velocity estimated from successive locations.

14. The method of claim 13, further comprising storing a location hypercube instance for the target locatable comprising:
   a coordinate pair identifying the location of the target locatable;
   a time stamp at which the coordinate pair was recorded; and
   an estimated velocity of the target locatable.

15. The method of claim 1, wherein obtaining the updated location comprises estimating the updated location of the target locatable using a profile and history of the target locatable.

16. The method of claim 1, wherein a frequency of obtaining the updated location is based on a spatial relationship between the source locatable and target locatable.

17. A system for enabling in-network location based services in a computer system comprising:
   (a) a persistent datastore communicatively coupled to a location server;
   (b) trigger information stored in the persistent datastore, wherein the trigger information defines:
      (i) a source locatable that specifies an object of interest;
      (ii) spatial information that defines spatial criteria for a target locatable that will activate the trigger;
      (iii) a notification flag that describes an interaction between the source locatable and the spatial criteria that will cause an alert; and
      (iv) temporal information that defines a time period for which the trigger will be active;
   (c) a location server on a wireless network, wherein the location server is configured to:
      (i) receive trigger information for one or more triggers from a location based application located outside of the wireless network;
      (ii) determine if the one or more triggers are active based on the temporal information;
      (iii) obtain an updated location of the target locatable if the trigger is active;
      (iv) evaluate the active triggers by determining if a trigger alert has been caused by the source locatable interacting with the target locatable in accordance with the spatial information and notification flag; and
      (v) push a location answer to the location based application if a trigger alert has been caused.

18. The system of claim 17, wherein:
   the source locatable comprises a mobile locatable that defines a location described by an identifier of a mobile device; and
   the location server is further configured to evaluate the active triggers by retrieving an updated location of the mobile locatable.

19. The system of claim 17, wherein the source locatable comprises a fixed locatable that is defined by a coordinate pair.

20. The system of claim 17, wherein the spatial information comprises a start stop filter that detects if the target locatable has started or stopped moving.

21. The system of claim 17, wherein the spatial information comprises a buffered locatable filter that describes a buffer around the target locatable.

22. The system of claim 17, wherein the temporal information comprises an active temporal filter that defines a period of time that starts now and ends at a defined time.

23. The system of claim 17, wherein the temporal information comprises a scheduled temporal filter that defines a fixed period of time.

24. The system of claim 17 wherein the persistent datastore is temporally indexed.

25. The system of claim 17, wherein the location server is further configured to determine if the trigger is active based on spatial information by:
   obtaining a location area for the target locatable from a passive database;
   comparing the location area to a location area index for the trigger; and
   filtering out triggers if the location area is not within the location area index.

26. The system of claim 17, wherein the location server is further configured to add active triggers to an in-memory trigger cache.

27. The system of claim 17, wherein the location server is further configured to store the updated location in a spatially indexed cache that provides the ability to filter out target locatables that are not in proximity to the source locatable as specified in the spatial information.

28. The system of claim 17, wherein the location server is configured to obtain the updated location by estimating the updated location of the target locatable using a previous location of the target locatable, a timestamp of the previous location, and a velocity estimated from successive locations.

29. The system of claim 28, wherein the location server is further configured to store a location hypercube instance for the target locatable, wherein the location hypercube comprises:
   a coordinate pair identifying the location of the target locatable;
   a time stamp at which the coordinate pair was recorded; and
   an estimated velocity of the target locatable.

30. The system of claim 17, wherein the location server is configured to obtain the updated location by estimating the updated location of the target locatable using a profile and history of the target locatable.

31. The system of claim 17, wherein the location server obtains the updated location at a frequency that is based on a spatial relationship between the source locatable and target locatable.

* * * * *